United States Patent
Roopesh et al.

(10) Patent No.: US 12,501,330 B2
(45) Date of Patent: Dec. 16, 2025

(54) HANDOVER TIMELINES AND POWER OPTIMIZATION FOR USER EQUIPMENT IN MULTIPLE SUBSCRIBER IDENTITY MODULE DUAL RECEIVE SCENARIOS

(71) Applicant: QUALCOMM Incorporated, San Diego, CA (US)

(72) Inventors: D Roopesh, Chittoor (IN); Mahesh Premnath Dubey, Mumbai (IN); Rohit Joshi, Hyderabad (IN); Ashish Gaonekar, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 448 days.

(21) Appl. No.: 18/057,610

(22) Filed: Nov. 21, 2022

(65) Prior Publication Data

US 2024/0172068 A1 May 23, 2024

(51) Int. Cl.
*H04W 36/00* (2009.01)

(52) U.S. Cl.
CPC ... *H04W 36/0085* (2018.08); *H04W 36/0069* (2018.08)

(58) Field of Classification Search
CPC ......... H04W 36/0069; H04W 36/0085; H04W 60/005; H04W 8/183; H04W 60/001; H04W 60/002
See application file for complete search history.

(56) References Cited

U.S. PATENT DOCUMENTS

| | | | |
|---|---|---|---|
| 2011/0267978 A1* | 11/2011 | Etemad | H04L 5/0016 370/254 |
| 2015/0139015 A1* | 5/2015 | Kadous | H04W 36/0085 370/252 |
| 2016/0157148 A1* | 6/2016 | Kato | H04W 36/04 455/444 |
| 2016/0174232 A1* | 6/2016 | Krishnamoorthy | H04B 1/1027 455/452.2 |
| 2020/0128479 A1* | 4/2020 | Xu | H04W 76/30 |
| 2020/0336887 A1* | 10/2020 | Ou | H04W 8/24 |
| 2022/0150766 A1* | 5/2022 | Zhao | H04W 36/0058 |
| 2022/0167225 A1* | 5/2022 | Kwak | H04W 36/0088 |
| 2022/0303755 A1* | 9/2022 | Karakkad Kesavan Namboodiri | H04W 8/183 |
| 2022/0361240 A1* | 11/2022 | Gummadi | H04W 12/45 |
| 2022/0400528 A1* | 12/2022 | Ravuvari | H04W 36/087 |
| 2022/0417990 A1* | 12/2022 | Chen | H04L 5/0098 |
| 2023/0107904 A1* | 4/2023 | Wang | H04W 8/183 370/329 |

(Continued)

*Primary Examiner* — Stephen J Clawson
(74) *Attorney, Agent, or Firm* — Patterson & Sheridan LLP

(57) ABSTRACT

Certain aspects of the present disclosure provide techniques for handover timelines and power optimization for user equipment (UE) in multiple subscriber identity module (MSIM) dual receive (DR) scenarios. An example method, performed by a UE, includes entering a DR mode in which a first subscriber identity module (SIM) is active in a first radio access technology (RAT) and a second SIM is idle in a second RAT, identifying one or more channel frequencies, of a neighbor channel frequency list, that are incompatible with the DR mode, and performing a channel measurement procedure with the second SIM, on a subset of the neighbor channel frequency list that does not include the one or more channel frequencies that are incompatible with the DR mode.

24 Claims, 11 Drawing Sheets

(56) References Cited

U.S. PATENT DOCUMENTS

| | | | |
|---|---|---|---|
| 2023/0121194 A1* | 4/2023 | Tindola | H04W 36/0058 370/331 |
| 2023/0199479 A1* | 6/2023 | Li | H04W 60/04 370/329 |
| 2023/0319611 A1* | 10/2023 | Lin | H04W 24/08 370/252 |
| 2023/0328613 A1* | 10/2023 | Gupta | H04W 48/18 370/331 |
| 2023/0354279 A1* | 11/2023 | Kumar | H04L 5/001 |
| 2024/0405953 A1* | 12/2024 | He | H04B 7/0695 |

* cited by examiner

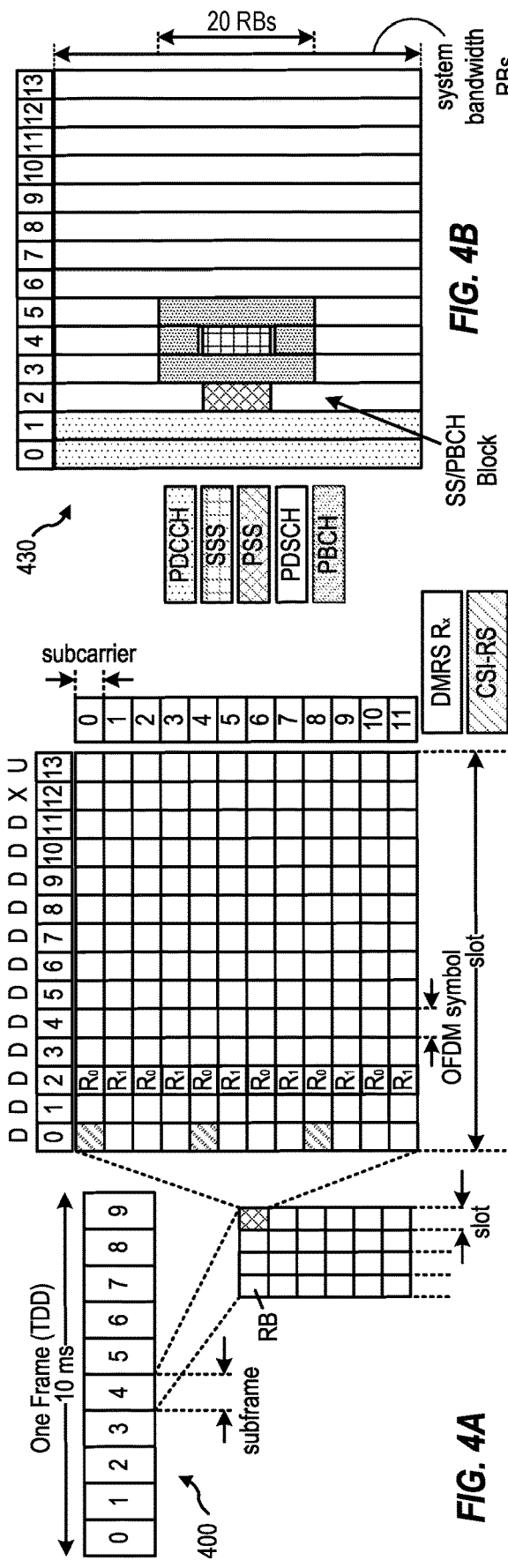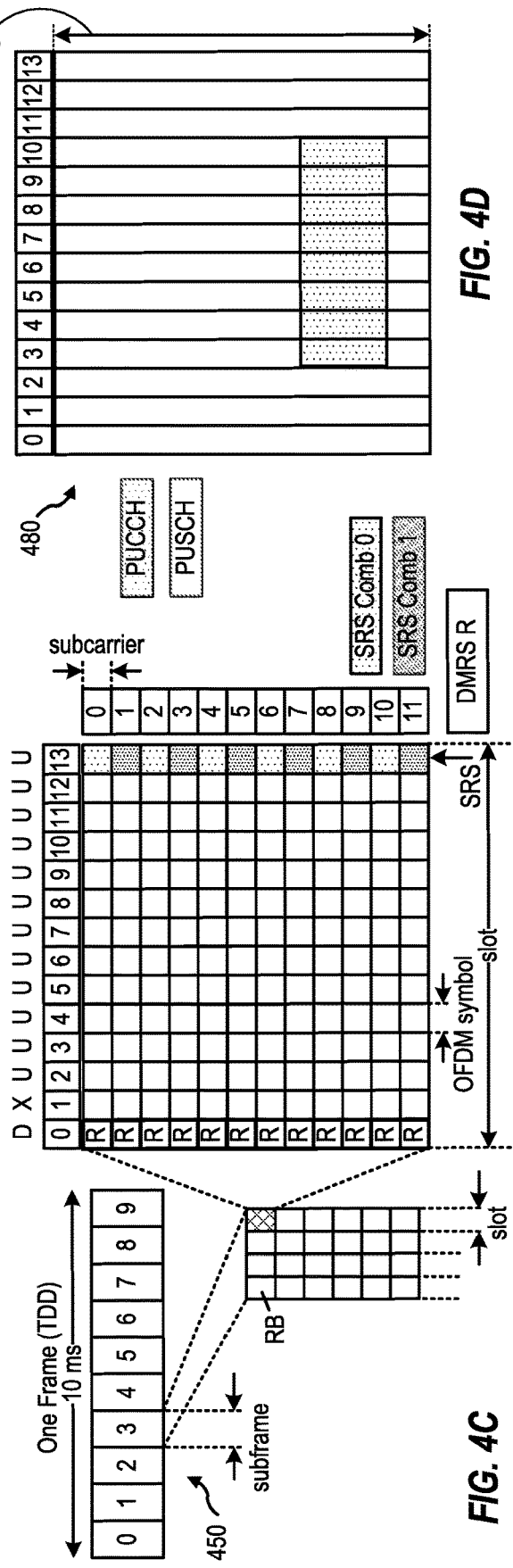

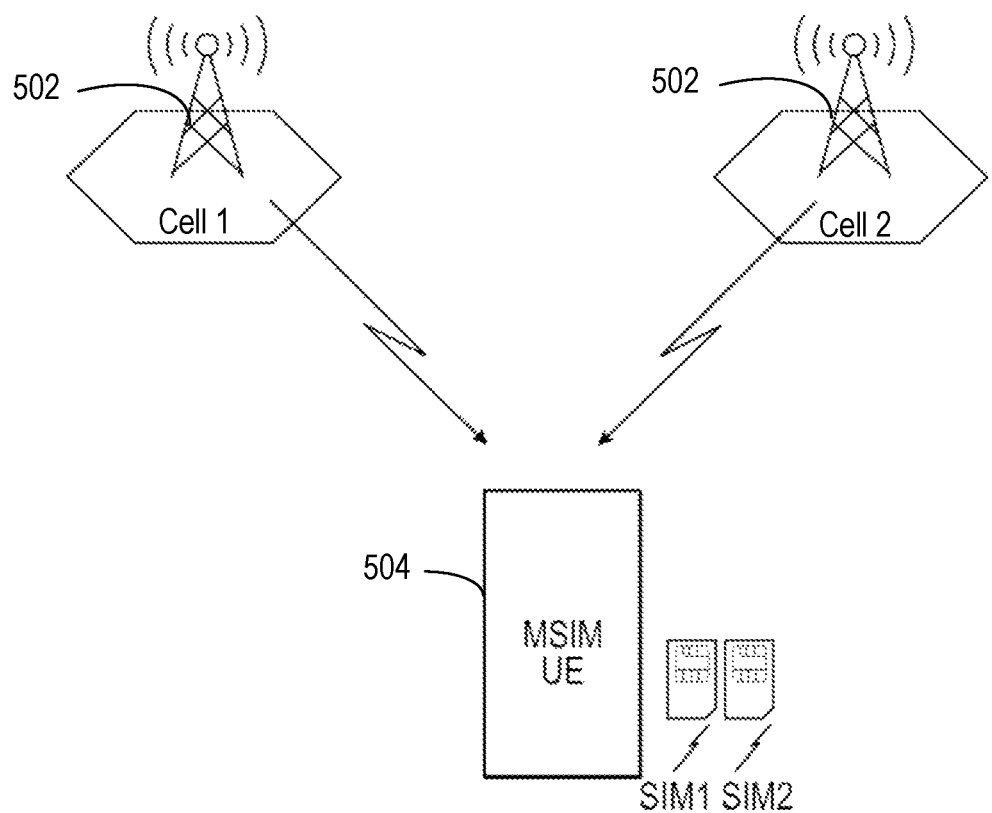

700 ⟶

Idle Neighbor Bands: Ly, Lz

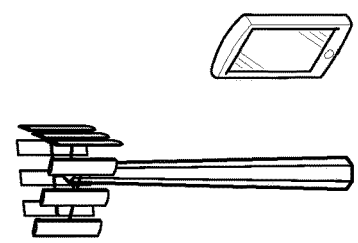
104

UE is in DR mode: NR5G + LTE
NR bands: Nx + Ny
LTE band: Lx

Location: A

Idle Neighbor Bands: Ly, Lz, La, Lb, Na, Nb

| Sub1: Bands | Sub2: Bands | Sub2 Neighbor Bands | DR Mode compatibility |
|---|---|---|---|
| Nx + Ny | Lx | Ly, Lz | Ly: compatible<br>Lz: compatible (a good signal strength) |
| Na + Ny | Lx | Ly, Lz, La, Lb, Na | Ly: Incompatible<br>Lz: Incompatible<br>La: Incompatible<br>Lb: Incompatible<br>Na: Compatible (a very low signal strength) |

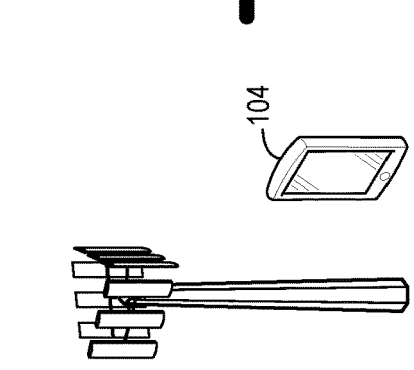

UE is in DR mode: NR5G + LTE
NR bands: Na + Ny
LTE band: Lx

Location: B

At Location A:
Idle Tech neighbor bands: Ly, Lz
1st DRx cycle: Bands measured: Ly, Lz
LTE camped on band Lz since it has good signal strength At Location B:
Idle Tech neighbor bands: Ly, Lz, La, Lb, Na
1st DRx cycle: Bands measured: Ly, Lz, La, Lb, Na
710 ⟶ ‹2nd DRx cycle: Bands measured: Ly, Lz, La, Lb, Na›

FIG. 7

Idle Neighbor Bands: Ly, Lz, La, Lb, Na, Nb

| Sub1: Bands | Sub2: Bands | Sub2 Neighbor Bands | DR Mode compatibility |
|---|---|---|---|
| Nx + Ny | Lx | Ly, Lz | Ly: compatible<br>Lz: compatible (a good signal strength) |
| Na + Ny | Lx | Ly, Lz, La, Lb, Na | Ly: Incompatible<br>Lz: Incompatible<br>La: Incompatible<br>Lb: Incompatible<br>Na: Compatible (a very low signal strength) |

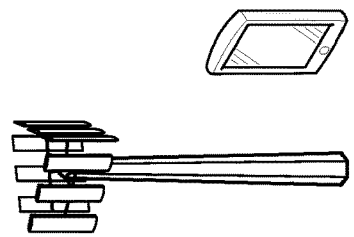

UE is in DR mode: NR5G + LTE
NR bands: Na + Ny
LTE band: Lx

Location: B

Idle Neighbor Bands: Ly, Lz

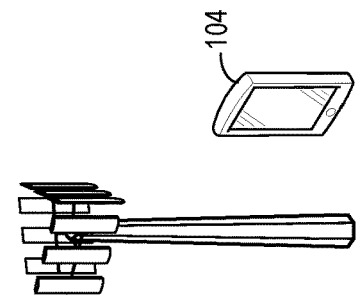

104

UE is in DR mode: NR5G + LTE
NR bands: Nx + Ny
LTE band: Lx

Location: A

At Location A:
Idle Tech neighbor bands: Ly, Lz
1st DRx cycle: Bands measured: Ly, Lz
LTE camped on band Lz since it has good signal strength At Location B:
Idle Tech neighbor bands: Ly, Lz, La, Lb, Na
1st DRx cycle: Bands measured: Ly, Lz, La, Lb, Na
2nd DRx cycle: Bands measured: Na

HANDOVER TIMELINES AND POWER OPTIMIZATION FOR USER EQUIPMENT IN MULTIPLE SUBSCRIBER IDENTITY MODULE DUAL RECEIVE SCENARIOS

BACKGROUND

Field of the Disclosure

Aspects of the present disclosure relate to wireless communications, and more particularly, to techniques that may help optimize channel measurement procedures for a user equipment (UE) in multiple subscriber identity module (MSIM) dual receive (DR) scenarios.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes entering a dual receive (DR) mode in which a first subscriber identity module (SIM) is active in a first radio access technology (RAT) and a second SIM is idle in a second RAT; identifying one or more channel frequencies, of a neighbor channel frequency list, that are incompatible with the DR mode; and performing a channel measurement procedure with the second SIM, on a subset of the neighbor channel frequency list that does not include the one or more channel frequencies that are incompatible with the DR mode.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 5 depicts an example multiple subscriber identity module (MSIM) deployment for a UE, in accordance with certain aspects of the present disclosure.

FIG. 7 depicts an example MSIM dual receive (DR) scenario.

FIG. 8 depicts an example MSIM DR scenario, in accordance with aspects of the present disclosure.

DETAILED DESCRIPTION

Figure 1:
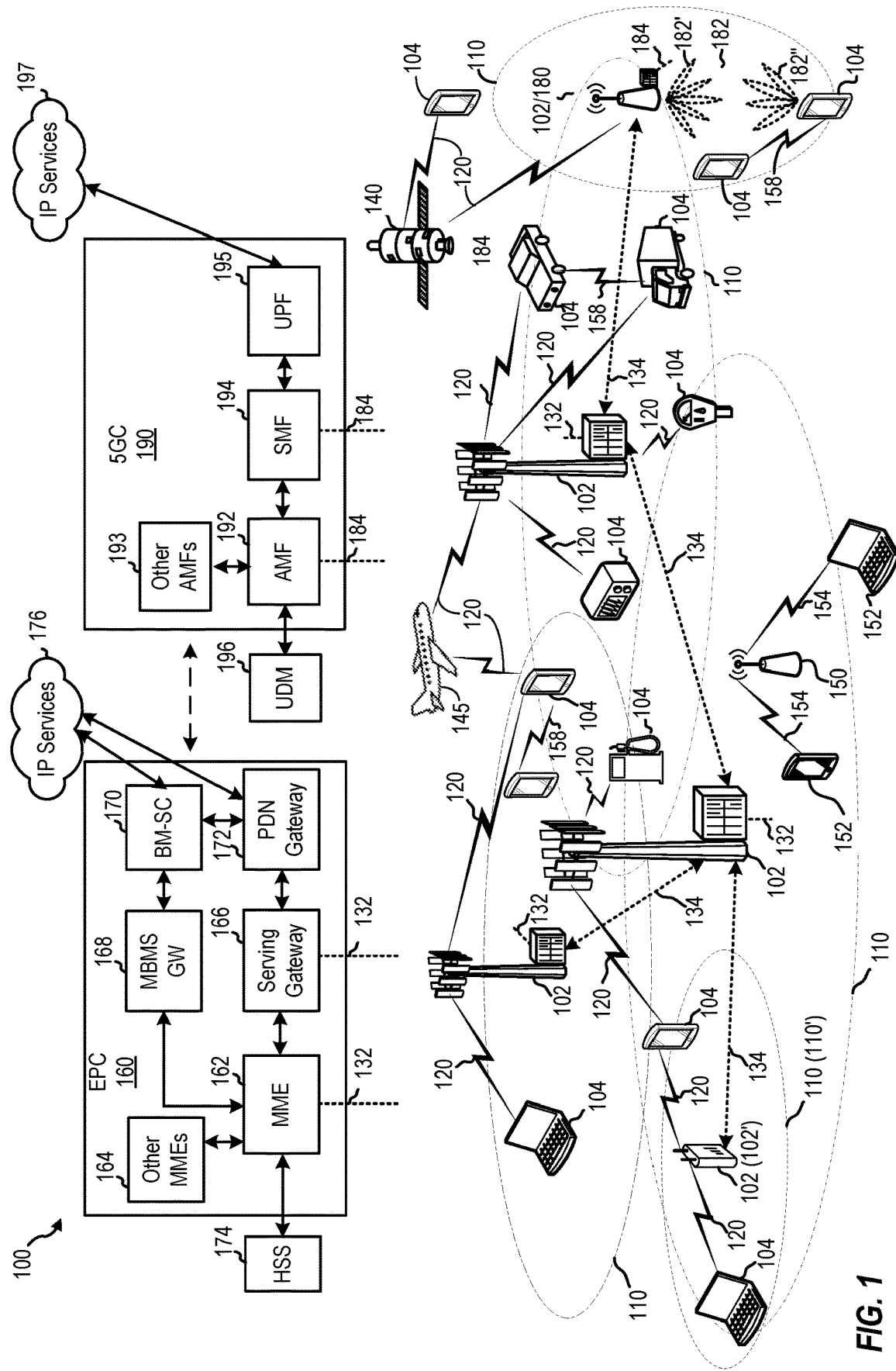
FIG. 1 depicts an example wireless communications network.

Aspects of the present disclosure provide apparatuses, methods, processing systems, and computer-readable mediums for techniques that may help optimize channel measurement procedures for a user equipment (UE) in multiple subscriber identity module (MSIM) dual receive (DR) scenarios.

In some cases, a UE may support multiple SIMs, which may allow the UE to concurrently communicate in multiple cells of the same or different radio access technologies (RATs). For example, a UE in a multiple SIM (multi-SIM) mode could support LTE and NR/5G in a DR scenario. In this case, LTE could be connected on one subscriber (SUB) via one SIM with both downlink (DL) and uplink (UL) channels, while NR is active on another SUB via another SIM performing system information block (SIB) page decoding using two downlink channels.

For inter radio access technology (IRAT) and inter frequency scanning (IFS) handover (HO) management, multiple channel and frequency scanning procedures may be performed in real time. In certain DR scenarios, however, some frequency combinations on different SUBs may be incompatible. For example, in a Dual Receive Dual Standby (DRDS) scenario, the primary transmit (Tx) and receive (Rx) resources of a SUB in a connected state may be retained over the Rx resources of a SUB in an idle state. This effectively means that if the radio access technology (RAT) channel-frequency of the idle SUB has RF resources which has restrictions with the primary RF resources of a connected SUB, then the connected SUB is prioritized. In this context, an idle SUB RAT channel-frequency may be referred to as DR-incompatible with the connected SUB RAT.

For example, in an MSIM scenario, data activity may need to be ensured at least a minimum amount of resources (e.g., one Rx channel and one Tx channel). In such cases, a grant of RF resources for an idle SUB may need to be made in a manner that ensures at least single Rx/Tx channel operation on a data SUB. If the minimum RF resources cannot be ensured, the other SUB operation may need to be suppressed for the incompatible frequency and channels.

DR incompatibility can potentially cause issues when a UE is active in a DRDS mode and an idle SUB attempting to performing measurement of neighbor channel-frequencies in discontinuous reception (DRX) cycles. For example, if the neighbor channel-frequencies have RF conflicts with a connected SUB tech, a request for the resources to perform the measurements may get denied. Even after denial, the idle SUB may keep trying to perform the measurement for the same set of (incompatible) channel-frequencies in each DRX cycle. This may result in a delay in handover, may also cause the UE to miss paging message decodes, and may result in a loss of service due to a delay in handover and the idle SUB going out of service (OOS).

Modem power consumption may also be impacted, as the modem may be active for a longer time than required due to unnecessary measurement attempts (on incompatible channel-frequencies). In other words, the idle SUB may continue to search for the same channel-frequency for which RF resource cannot be granted, causing the modem to be active for a long duration.

Aspects of the present disclosure may help address these potential issues caused by RF channel-frequency incompatibility. For example, a UE in a DR mode may identify one or more channel frequencies that are incompatible with a first SIM and perform a channel measurement procedure with the second SIM, on a subset of the neighbor channel frequency list that does not include these incompatible channel frequencies.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
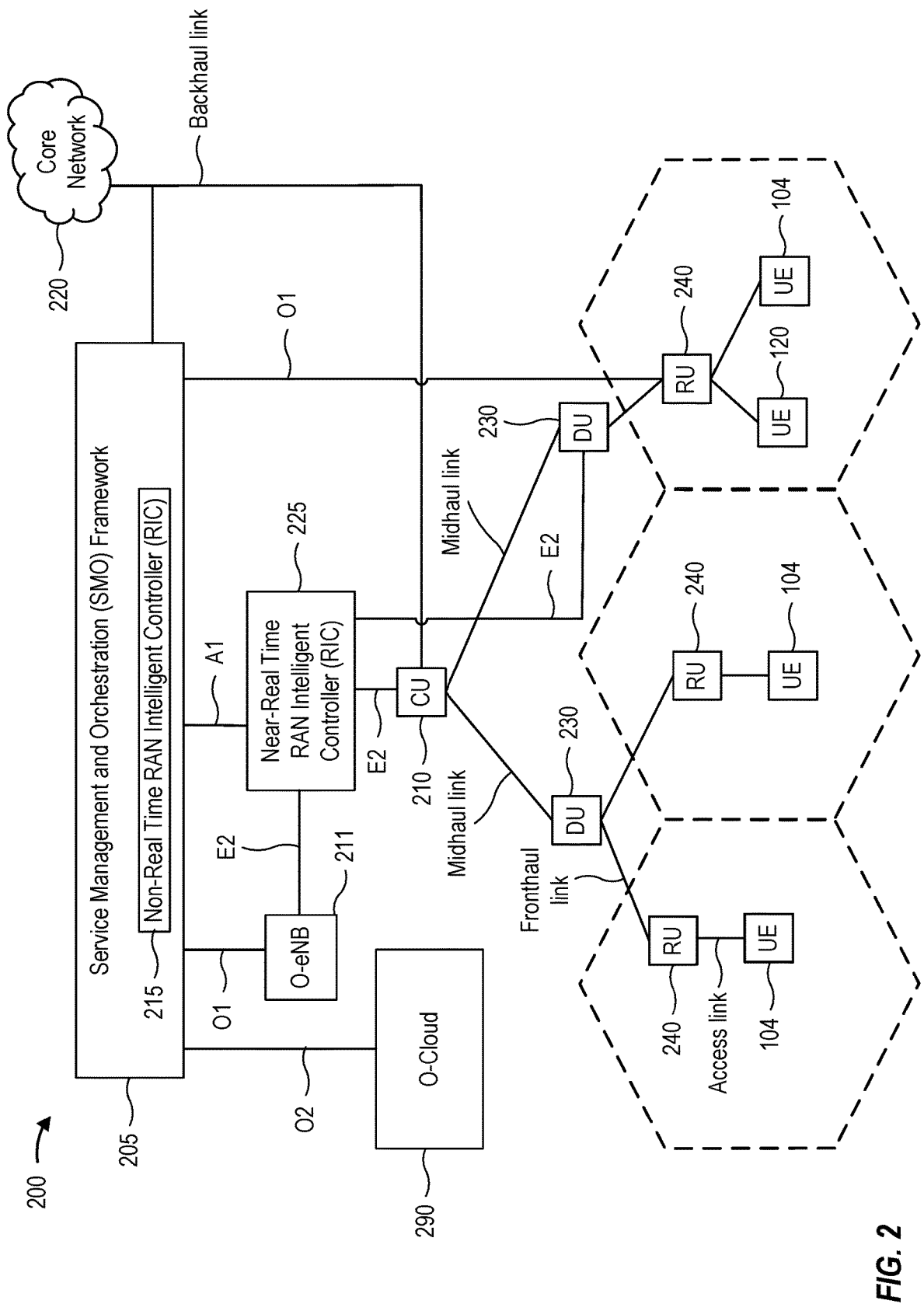
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3r d Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
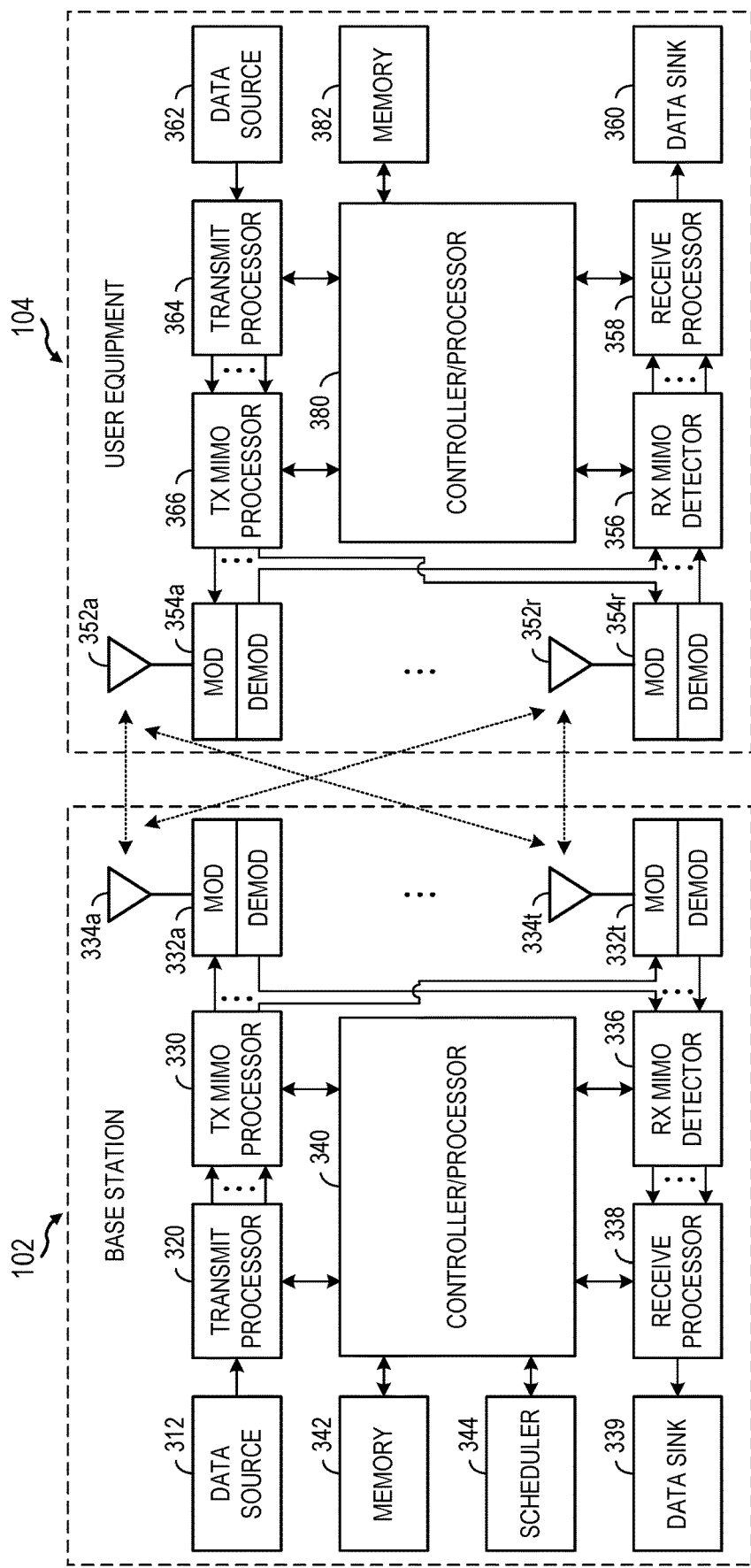
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example MSIM Operation

FIG. 5 illustrates an example multi-SIM (MSIM) deployment 500, in which a UE 504 supports multiple SIMs (SIM1 and SIM2). The multiple SIMs may allow the UE to concurrently communicate with base stations 502 of multiple cells (Cell 1 and Cell 2), which may support the same or different radio access technologies (RATs). In this context, concurrently means a UE may be able to establish a connection in multiple cells and, in some case, communicate simultaneously in multiple cells.

In some cases, a UE with a single receiver may support a Single Receive Dual SIM Dual Standby (SR-DSDS) mode, where only one RAT is received at a time. In a Dual Receive (DR)-DSDS mode, the MSIM UE may communicate simultaneously with multiple RATs at the same time.

NR concurrent radio-access technology (RAT) operation generally refers to operating multiple simultaneous (at least partially overlapping) active connections with at least one connection being on NR. For example, the two connections may involve LTE and NR connections, or both NR connections. Multi-SIM devices are able to connect to multiple networks independently without network awareness. Different UE behaviors may occur based on different implementations like dual-SIM dual active (DSDA) or dual-SIM dual standby (DSDS). DSDS generally refers to a dual-SIM deployment where the two SIM cards of the UE may be unable to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMs to support a variety of different combination options. For example, dual-SIM (DSIM) devices could support the following:

SA-NR+SA-NR: both SIMs could support standalone (SA) NR (SA-NR);

NSA-NR+LTE: one SIM supports non-standalone (NSA) while another SIM supports LTE;

LTE+LTE: both SIMs support LTE;

LTE+W: one SIM supports LTE, the other supports wideband CDMA; or any other combination (X RAT+X RAT both SIMs the same RAT or X RAT+Y RAT the SIMs support different RATs).

Figure 6:
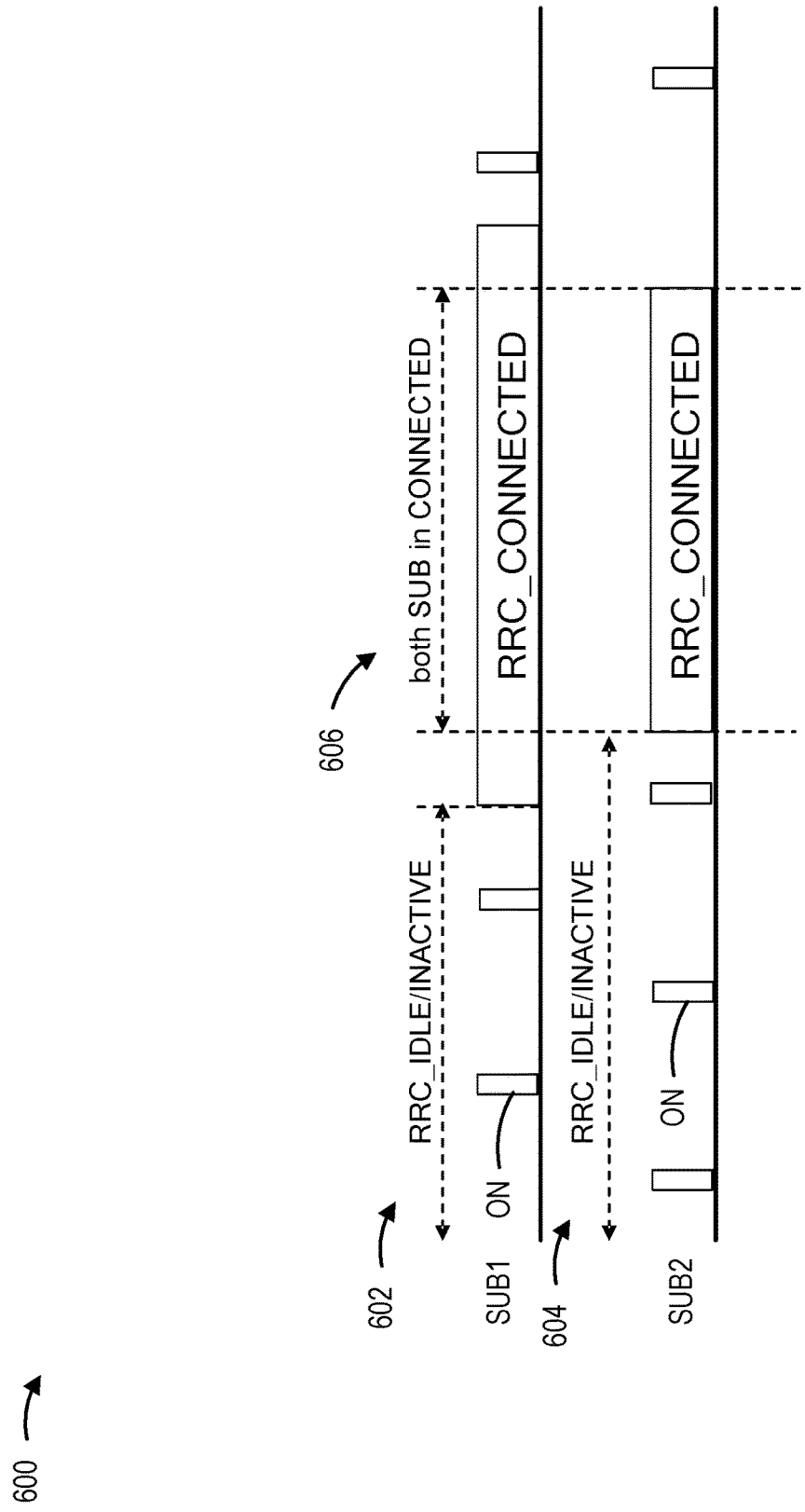
FIG. 6 depicts an example timeline for a dual SIM dual active (DSDA) operation.

In some cases, in a multi-SIM deployment, each SIM of the UE can belong to the same network carrier. For example, two or more SIMs (also referred to herein as subscribers or SUBS) belonging to the same operator can be in the following modes:

(1) Idle+Idle: 2 or more SUBS in Idle camp to the same cell (2) Connected+Idle: 1 SUB in Idle and 1 Sub Connected camp to the same cell As illustrated in FIG. 6, at any given time, the multiple SIMS may support different modes of operation. For example, one or both SIMs may be in RRC Idle/Inactive modes 602/604, during which they periodically exit from a low power state (wake up) during ON periods of a DRX mode.

As illustrated at 606, in a Dual-SIM Dual-Active (DSDA) mode, two SIMs (which may support different RATs) may be concurrently in connected state with Tx active. The two SIMs may use independent radio frequency (RF) resources (e.g., antenna, RF front end, baseband processing, or other processing resources) or may share RF resources. As a result of sharing, both SIMs may suffer limitations on transmit (Tx) and receive (Rx) capability during DSDA operation, due the sharing of RF resources. In DSDA operation, there may be two data paths available for upper layer traffic. As a result, DSDA may enable flexible data transmission.

Aspects Related to Handover Timelines and Power Optimization for UE in MSIM Dual Receive Scenarios Aspects of the present disclosure provide apparatuses, methods, processing systems, and computer-readable mediums for techniques that may help optimize channel measurement procedures for a user equipment (UE) in multiple subscriber identity module (MSIM) dual receive (DR) scenarios.

The techniques proposed herein may help improve efficiency in IRAT/IFS scanning procedures by eliminating unsupported frequencies from measurement. The unsupported frequencies could be of any format, for example, not supported based on hardware or may be scenario-specific unsupported frequencies, like those incompatible with certain MSIM DR modes. In the present disclosure, frequencies may be referred as channel-frequencies, frequency bands, operating bands, or simply bands. Further, while examples described herein refer to LTE and NR/5G as examples of different RATs, the techniques described herein may be applicable to any type of RAT, or combination of RATs, including 1×, GSM, WCDMA, LTE or NR.

As noted above, a UE may support multiple SIMs, which may allow the UE to concurrently communicate in multiple cells of the same or different radio access technologies (RATs). For IRAT/IFS handover (HO) management, multiple channel and frequency scanning procedures may be performed in real time, however some frequency combinations on different SUBs may be incompatible. For example, in an MSIM scenario, data activity may need to be ensured at least a minimum amount of resources, which may result in a denial of a grant of RF resources for an idle SUB.

If the minimum RF resources cannot be ensured, the other SUB operation may need to be suppressed for the incompatible frequency and channels, which may cause issues when a UE is active in a DRDS mode and an idle SUB attempting to performing measurement of neighbor channel-frequencies in discontinuous reception (DRX) cycles.

As noted above, if the neighbor channel-frequencies have RF conflicts with a connected SUB RAT, a request for the resources to perform the measurements may get denied. Even after denial, the idle SUB may keep trying to perform the measurement for the same set of (incompatible) channel-frequencies in each DRX cycle. This may result in a delay in handover, may also cause the UE to miss paging message decodes, and may result in a loss of service due to a delay in handover and the idle SUB going out of service (OOS).

Aspects of the present disclosure may help address these potential issues caused by RF channel-frequency incompatibility. For example, a UE in a DR mode may identify one or more channel frequencies that are incompatible with a first SIM and perform a channel measurement procedure with the second SIM, on a subset of the neighbor channel frequency list that does not include these incompatible channel frequencies.

The techniques proposed herein may be understood by considering a case of a dual-SIM UE with one SUB connected in NR (e.g., in channel-frequency N1 and N41) and another SUB idle on LTE channel-frequency X. The idle LTE SUB may attempt to perform measurements of channel-frequency Y, which may have RF restrictions with NR connected channel-frequency N1. As a result, the LTE idle SUB may remain in a wait state, waiting for RF resources for channel-frequency Y for an entire search window.

In some cases, the LTE idle SUB may again reattempt measurement of channel-frequency Y in a next DRX cycle, while the idle SUB is active on X and the other SUB is connected to NR on channel-frequencies N1 and N41. RF resources for the NR connected RF SUB may not be changed until there is a carrier reconfiguration. Thus, measurement of channel-frequency Y may not be successfully performed.

Unfortunately, the LTE idle SUB may keep unnecessarily attempting measurements on DR incompatible channel-frequencies in each search attempt, increasing modem power consumption.

FIG. 7 illustrates an example scenario in which DR incompatible channel-frequencies can impact handover management without excluding DR incompatible channel-frequencies in the manner proposed herein.

In the illustrated example, a UE at a first location (Location A) is in DR mode (NR/5G and LTE) with a first SUB in a connected state in NR with two component carriers (CC): a primary component carrier (PCC) on channel-frequency Nx and a secondary component carrier (SCC) on channel-frequency Ny. A second SUB is in an idle state in LTE on channel-frequency Lx.

At Location A, available LTE neighbor channel-frequencies are Ly and Lz, which are both DR compatible, as indicated in table 700. Thus, a search module measures every channel-frequency in neighbor channel-frequencies list during a DRX cycle. Within a first measurement attempt, the LTE SUB may find a DR compatible channel-frequency Ly with good signal strength. Thus, the LTE SUB may camp on channel-frequency Ly.

At a second location (Location B), the idle LTE SUB neighbor channel-frequencies are Ly, Lz, La, Lb, and Na. During a DRX cycle, a search may be performed on all available neighbor channel-frequencies. As indicated in table 700, however, channel-frequencies are Ly, Lz, La, Lb are DR incompatible. Thus, the UE may not be granted resources to scan these frequencies. Further, in the illustrated example, while Na is DR compatible, the idle SUB will not camp on Na due to low signal strength.

As illustrated at 710, without excluding DR incompatible channel-frequencies, in a next measurement attempt, the (idle LTE SUB) search module will attempt to perform searches on all neighbor channel-frequencies again, including the DR incompatible channel-frequencies, impacting modem power consumption.

Aspects of the present disclosure, however, may keep track of DR incompatible channel-frequencies and exclude them from searches, avoiding unnecessary searches for channel-frequencies which may be known will not succeed (e.g., due to DR incompatibility). In some cases, a common module (e.g., common to multiple SUBS) may indicate DR incompatibility (e.g., no concurrent RF support) information to a search module.

Thus, if a SUB attempts to perform a measurement for a channel-frequency, and that SUB is not granted RF resources due to DR-incompatibility, then the search module may record that particular channel-frequency (e.g., add it to a blacklist). As a result, in a subsequent DRX cycle wakeup, the search module may not perform measurements on channel-frequencies that are blacklisted. Rather, an idle SUB may perform searches only on neighbor DR compatible channel-frequencies (or may perform no searches if all neighbor channel-frequencies are DR incompatible).

The impact of excluding DR incompatible channel-frequencies from searches may be understood by comparing the differences in the search performed in subsequent DRX cycles at location B in FIG. 7 and FIG. 8. As illustrated at 810, in FIG. 8, rather than attempt to measure DR incompatible channel frequencies, only compatible DR channel frequencies are measured (e.g., Na in this example).

In some cases, a common module may also keep track of carrier reconfiguration from a connected subscription. When a reconfiguration is triggered, the common module may indicate the search module to reset blacklisted channel-frequencies list. After reconfiguration, searches may be performed on all neighbor channel-frequencies, and a new blacklist of channel-frequencies may be created based on DR incompatibility with a new connected subscription configuration.

Aspects of the present disclosure may allow a modem idle SUB searches to not be active for DR incompatible channel-frequencies, which help optimizes power consumption.

Figure 9:
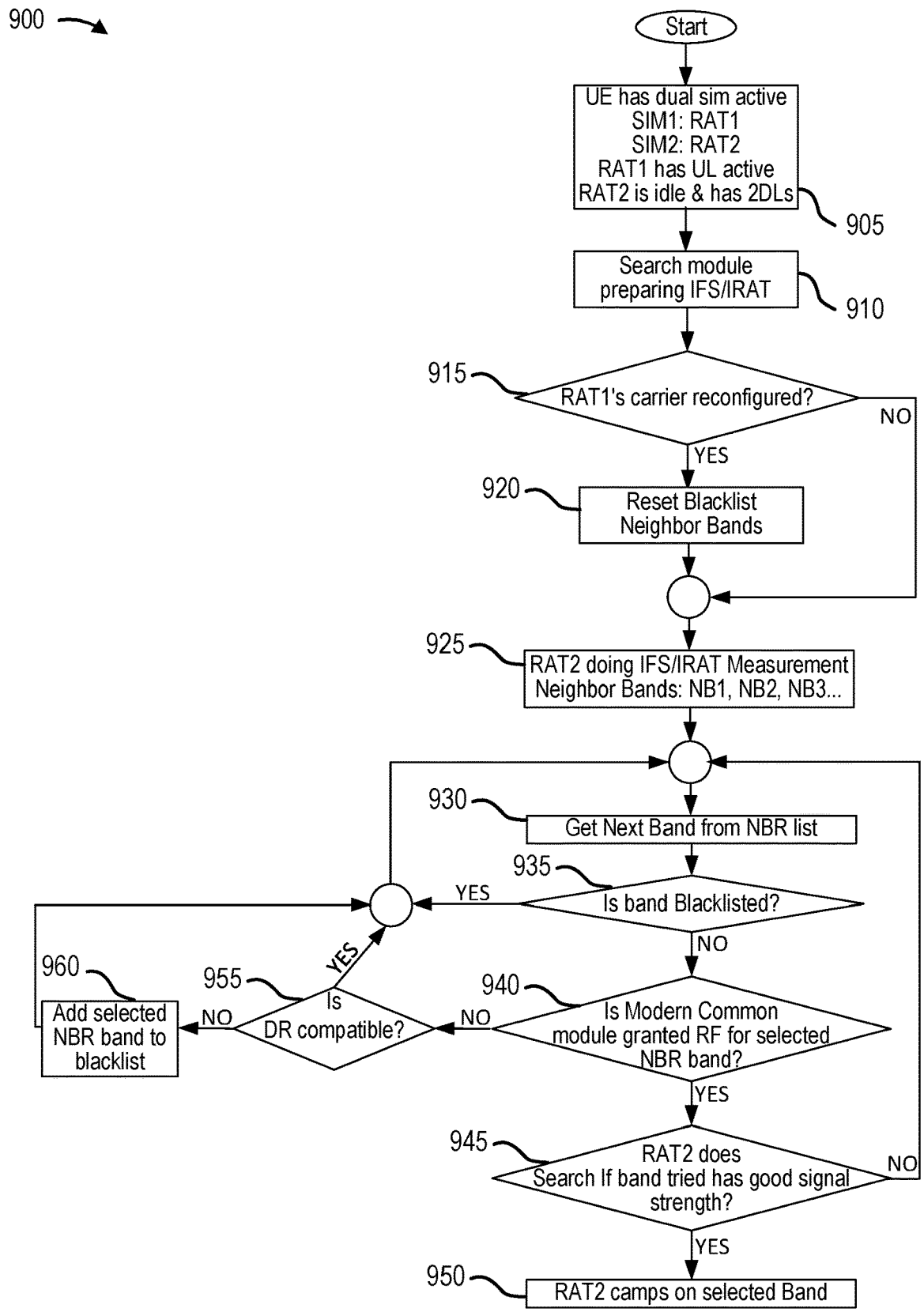
FIG. 9 depicts an example flow diagram, in accordance with aspects of the present disclosure.

FIG. 9 illustrates a flow diagram 900 for an algorithm to exclude DR incompatible frequency-channels from measurement. As shown at 905, the example may consider a scenario in which a UE is in MSIM mode with both SIMS active, where one SUB is connected (e.g., to an Idle mode) performing data activity while the other SUB is performing Idle operations, such as acquisition or SIB reads. Both SUBs may be able to obtain RF resources concurrently (e.g., idle and connected both are tuned to RF resource in overlapping timeframe).

The Idle sub may activate Intra RAT or InterRAT search measurement and prepare for an IF S/IRAT search, at 910. At 925, the Idle SUB may obtain an available list of neighboring frequencies and channel details from the network.

As shown, if the first RAT carrier reconfiguration occurs, as determined at 915, the blacklist may be reset (e.g., removing some or all frequency-channels from the blacklist, at 920.

As shown at 930, the RAT (idle SUB) may get the next frequency-channel from the neighbor list. If this frequency-channel is not blacklisted, as determined at 935, the idle SUB may determine if a modem common module granted RF resources for the selected neighbor frequency band, at 940. If the modem common module is granted RF resources, the operations may proceed to 945, at which time the second SUB may perform a currently selected frequency-channel has sufficient signal strength. If the currently selected frequency-channel has sufficient signal strength, the second SUB may camp on this frequency channel, as indicated at 950.

As illustrated at 940, if the modem common module is not granted RF resources, the operations may proceed to 955 to see, for example, if the currently selected neighbor channel is DR compatible. If the currently selected neighbor channel is DR incompatible, the operations may proceed to 960.

In some cases, the modem search module may check with an RF resource manager module for RF resource availability for these channel-frequencies that are concurrent with data subscription RF resources.

Based on an RF resource manager update, unsupported frequencies and channels may be removed from the search channel-frequencies list. In other words, they may not be considered for measurement. After this occurs, only supported frequencies may be part of the IRAT attempt search list.

Thus, reduced sets of frequencies may be used for searches (e.g., a second search may have a reduced set of frequencies compared to a first search), and RF resources may be allocated to them. Aspects of the present disclosure may, thus, improve search operation speed while optimizing handover processes/IRAT measurement processes.

Example Operations of a User Equipment

Figure 10:
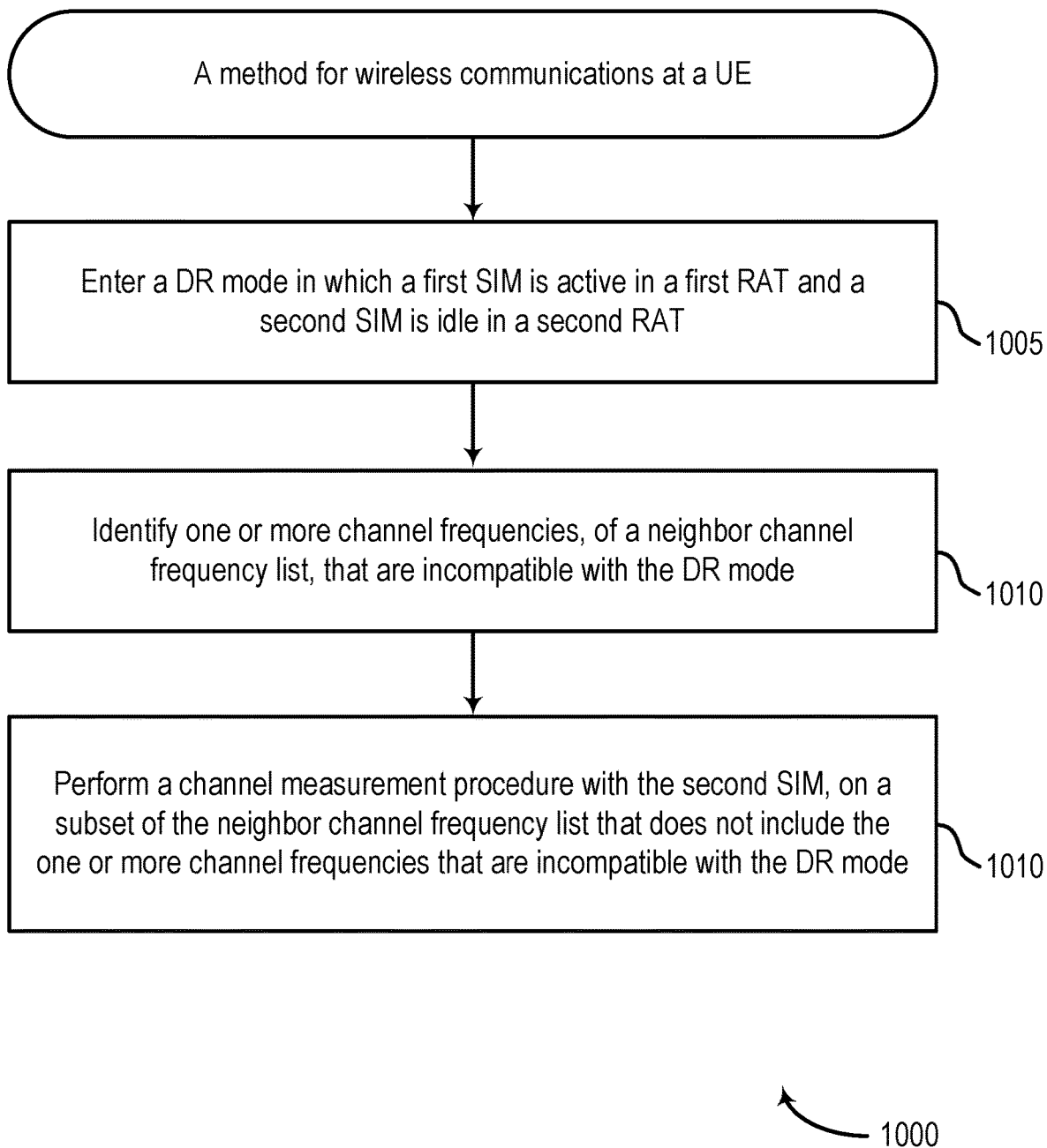
FIG. 10 depicts a method for wireless communications.

FIG. 10 shows an example of a method 1000 of wireless communication at a UE, such as a UE 104 of FIGS. 1 and 3.

Method 1000 begins at step 1005 with entering a DR mode in which a first SIM is active in a first RAT and a second SIM is idle in a second RAT. In some cases, the operations of this step refer to, or may be performed by, circuitry for entering and/or code for entering as described with reference to FIG. 11.

Method 1000 then proceeds to step 1010 with identifying one or more channel frequencies, of a neighbor channel frequency list, that are incompatible with the DR mode. In some cases, the operations of this step refer to, or may be performed by, circuitry for identifying and/or code for identifying as described with reference to FIG. 11.

Method 1000 then proceeds to step 1015 with performing a channel measurement procedure with the second SIM, on a subset of the neighbor channel frequency list that does not include the one or more channel frequencies that are incompatible with the DR mode. In some cases, the operations of this step refer to, or may be performed by, circuitry for performing and/or code for performing as described with reference to FIG. 11.

In some aspects, the first RAT and the second RAT share RF resources.

In some aspects, identifying the one or more channel frequencies are incompatible with the DR mode comprises receiving an indication that RF resources to perform measurement on the one or more channel frequencies are not granted.

In some aspects, the method 1000 further includes maintaining a list of the one or more channel frequencies that are incompatible with the DR mode. In some cases, the operations of this step refer to, or may be performed by, circuitry for maintaining and/or code for maintaining as described with reference to FIG. 11.

In some aspects, the method 1000 further includes excluding channel frequencies on the list when performing the channel measurement procedure with the second SIM. In some cases, the operations of this step refer to, or may be performed by, circuitry for excluding and/or code for excluding as described with reference to FIG. 11.

In some aspects, the method 1000 further includes receiving signaling indicating a carrier reconfiguration for the first RAT. In some cases, the operations of this step refer to, or may be performed by, circuitry for receiving and/or code for receiving as described with reference to FIG. 11.

In some aspects, the method 1000 further includes clearing the list in response to receiving the signaling. In some cases, the operations of this step refer to, or may be performed by, circuitry for clearing and/or code for clearing as described with reference to FIG. 11.

In some aspects, the first RAT and the second RAT comprise different RAT types.

Figure 11:
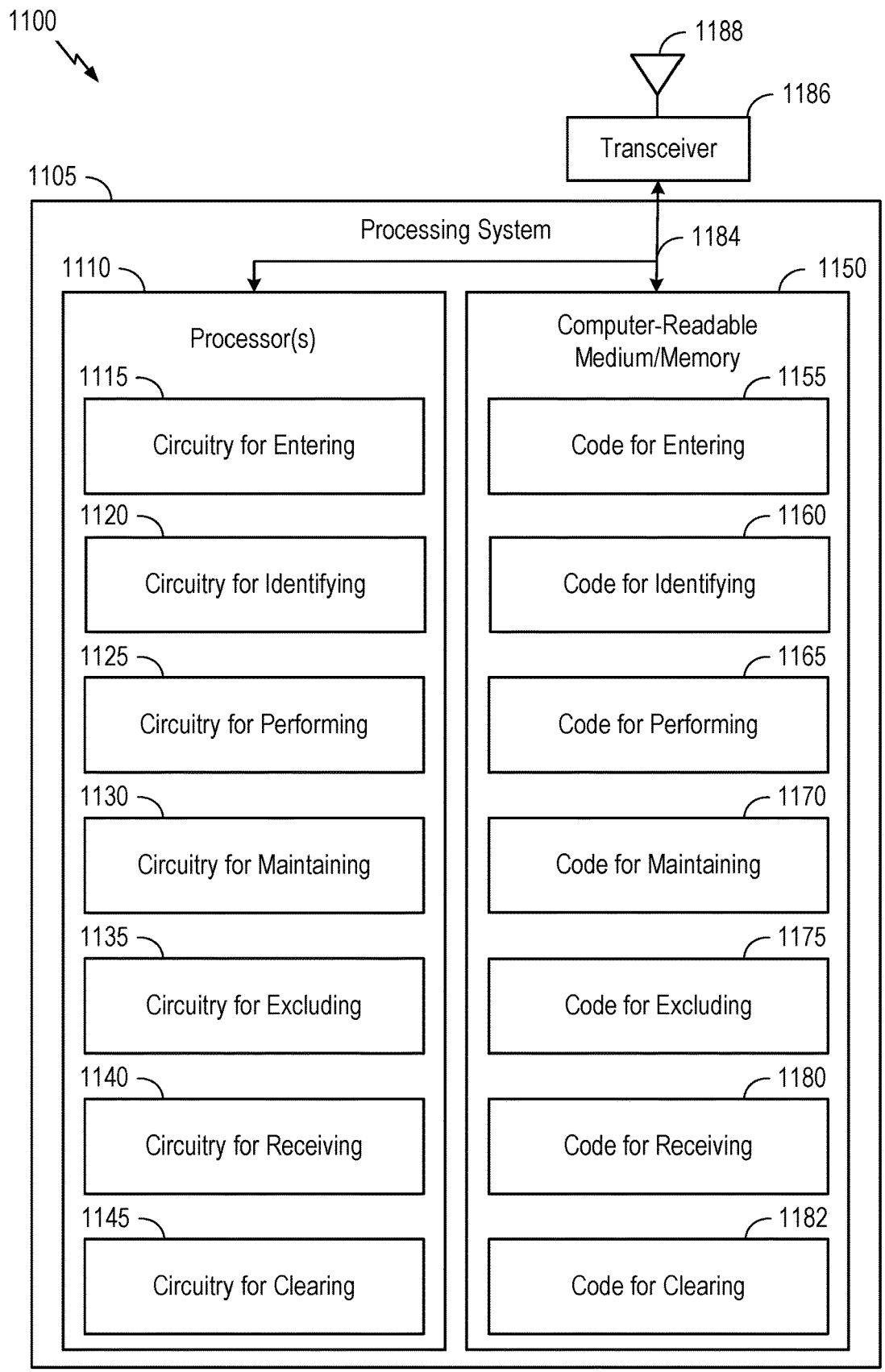
FIG. 11 depicts aspects of an example communications device.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to the transceiver 1186 (e.g., a transmitter and/or a receiver). The transceiver 1186 is configured to transmit and receive signals for the communications device 1100 via the antenna 1188, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1150 via a bus 1136. In certain aspects, the computer-readable medium/memory 1150 is configured to store instructions (e.g., computer-executable code) that when executed by the one or more processors 1110, cause the one or more processors 1110 to perform the method 1000 described with respect to FIG. 10, or any aspect related to it. Note that reference to a processor performing a function of communications device 1100 may include one or more processors 1110 performing that function of communications device 1100.

In the depicted example, computer-readable medium/memory 1150 stores code (e.g., executable instructions), such as code for entering 1115, code for identifying 1120, code for performing 1125, code for maintaining 1130, code for excluding 1135, code for receiving 1140, and code for clearing 1145. Processing of the code for entering 1115, code for identifying 1120, code for performing 1125, code for maintaining 1130, code for excluding 1135, code for receiving 1140, and code for clearing 1145 may cause the communications device 1100 to perform the method 1000 described with respect to FIG. 10, or any aspect related to it.

The one or more processors 1110 include circuitry configured to implement (e.g., execute) the code stored in the computer-readable medium/memory 1150, including circuitry such as circuitry for entering 1155, circuitry for identifying 1160, circuitry for performing 1165, circuitry for maintaining 1170, circuitry for excluding 1175, circuitry for receiving 1180, and circuitry for clearing 1182. Processing with circuitry for entering 1155, circuitry for identifying 1160, circuitry for performing 1165, circuitry for maintaining 1170, circuitry for excluding 1175, circuitry for receiving 1180, and circuitry for clearing 1182 may cause the communications device 1100 to perform the method 1000 described with respect to FIG. 10, or any aspect related to it.

Various components of the communications device 1100 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1186 and the antenna 1188 of the communications device 1100 in FIG. 11. Means for receiving or obtaining may include transceivers 354 and/or antenna(s) 352 of the UE 104 illustrated in FIG. 3 and/or the transceiver 1186 and the antenna 1188 of the communications device 1100 in FIG. 11.

Example Clauses

Implementation examples are described in the following numbered clauses:

Clause 1: A method for wireless communications at a UE, comprising: entering a DR mode in which a first SIM is active in a first RAT and a second SIM is idle in a second RAT; identifying one or more channel frequencies, of a neighbor channel frequency list, that are incompatible with the DR mode; and performing a channel measurement procedure with the second SIM, on a subset of the neighbor channel frequency list that does not include the one or more channel frequencies that are incompatible with the DR mode.

Clause 2: The method of Clause 1, wherein the first RAT and the second RAT share RF resources.

Clause 3: The method of Clause 2, wherein identifying the one or more channel frequencies are incompatible with the DR mode comprises receiving an indication that RF resources to perform measurement on the one or more channel frequencies are not granted.

Clause 4: The method of any one of Clauses 1-3, further comprising: maintaining a list of the one or more channel frequencies that are incompatible with the DR mode; and excluding channel frequencies on the list when performing the channel measurement procedure with the second SIM.

Clause 5: The method of Clause 4, further comprising: receiving signaling indicating a carrier reconfiguration for the first RAT; and clearing the list in response to receiving the signaling.

Clause 6: The method of any one of Clauses 1-5, wherein the first RAT and the second RAT comprise different RAT types.

Clause 7: An apparatus, comprising: a memory comprising executable instructions; and a processor configured to execute the executable instructions and cause the apparatus to perform a method in accordance with any one of Clauses 1-6.

Clause 8: An apparatus, comprising means for performing a method in accordance with any one of Clauses 1-6.

Clause 9: A non-transitory computer-readable medium comprising executable instructions that, when executed by a processor of an apparatus, cause the apparatus to perform a method in accordance with any one of Clauses 1-6.

Clause 10: A computer program product embodied on a computer-readable storage medium comprising code for performing a method in accordance with any one of Clauses 1-6.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
one or more memories comprising instructions; and
one or more processors, individually or collectively, configured to execute the instructions and cause the apparatus to:
enter a dual receive (DR) mode in which a first subscriber identity module (SIM) is active in a first radio access technology (RAT) and a second SIM is idle in a second RAT;
identify one or more channel frequencies, of a channel frequency list, that are incompatible with the DR mode based on unavailability of radio frequency (RF) resources required to perform measurements on the one or more channel frequencies; and
perform a channel measurement procedure with the second SIM, on a subset of the channel frequency list that does not include the one or more channel frequencies that are incompatible with the DR mode.

2. The apparatus of claim 1, wherein the first RAT and the second RAT share the RF resources.

3. The apparatus of claim 2, wherein the one or more processors, individually or collectively, are configured to execute the instructions and cause the apparatus to receive an indication that the RF resources to perform measurement on the one or more channel frequencies are not granted.

4. The apparatus of claim 1, wherein the one or more processors, individually or collectively, are configured to execute the instructions and cause the apparatus to:
maintain a list of the one or more channel frequencies that are incompatible with the DR mode; and
exclude channel frequencies on the list when performing the channel measurement procedure with the second SIM.

5. The apparatus of claim 4, wherein the one or more processors, individually or collectively, are configured to execute the instructions and cause the apparatus to:
receive signaling indicating a carrier reconfiguration for the first RAT; and
clear the list in response to receiving the signaling.

6. The apparatus of claim 1, wherein the first RAT and the second RAT comprise different RAT types.

7. A method for wireless communications at a user equipment (UE), comprising:
entering a dual receive (DR) mode in which a first subscriber identity module (SIM) is active in a first radio access technology (RAT) and a second SIM is idle in a second RAT;
identifying one or more channel frequencies, of a channel frequency list, that are incompatible with the DR mode based on unavailability of radio frequency (RF) resources required to perform measurements on the one or more channel frequencies; and
performing a channel measurement procedure with the second SIM, on a subset of the channel frequency list that does not include the one or more channel frequencies that are incompatible with the DR mode.

8. The method of claim 7, wherein the first RAT and the second RAT share the RF resources.

9. The method of claim 8, further comprising receiving an indication that the RF resources to perform measurement on the one or more channel frequencies are not granted.

10. The method of claim 7, further comprising:
maintaining a list of the one or more channel frequencies that are incompatible with the DR mode; and
excluding channel frequencies on the list when performing the channel measurement procedure with the second SIM.

11. The method of claim 10, further comprising:
receiving signaling indicating a carrier reconfiguration for the first RAT; and
clearing the list in response to receiving the signaling.

12. The method of claim 7, wherein the first RAT and the second RAT comprise different RAT types.

13. A non-transitory computer readable medium including executable instructions that, when executed by one or more processors of a user equipment (UE), cause the UE to perform a method, comprising:
entering a dual receive (DR) mode in which a first subscriber identity module (SIM) is active in a first radio access technology (RAT) and a second SIM is idle in a second RAT;
identifying one or more channel frequencies, of a channel frequency list, that are incompatible with the DR mode based on unavailability of radio frequency (RF) resources required to perform measurements on the one or more channel frequencies; and
performing a channel measurement procedure with the second SIM, on a subset of the channel frequency list that does not include the one or more channel frequencies that are incompatible with the DR mode.

14. The non-transitory computer readable medium of claim 13, wherein the first RAT and the second RAT share the RF resources.

15. The non-transitory computer readable medium of claim 14, further comprising receiving an indication that the RF resources to perform measurement on the one or more channel frequencies are not granted.

16. The non-transitory computer readable medium of claim 13, further comprising:
maintaining a list of the one or more channel frequencies that are incompatible with the DR mode; and
excluding channel frequencies on the list when performing the channel measurement procedure with the second SIM.

17. The non-transitory computer readable medium of claim 16, further comprising:
receiving signaling indicating a carrier reconfiguration for the first RAT; and
clearing the list in response to receiving the signaling.

18. The non-transitory computer readable medium of claim 13, wherein the first RAT and the second RAT comprise different RAT types.

19. An apparatus for wireless communications at a user equipment (UE), comprising:
means for entering a dual receive (DR) mode in which a first subscriber identity module (SIM) is active in a first radio access technology (RAT) and a second SIM is idle in a second RAT;
means for identifying one or more channel frequencies, of a channel frequency list, that are incompatible with the DR mode based on unavailability of radio frequency (RF) resources required to perform measurements on the one or more channel frequencies; and
means for performing a channel measurement procedure with the second SIM, on a subset of the channel frequency list that does not include the one or more channel frequencies that are incompatible with the DR mode.

20. The apparatus of claim 19, wherein the first RAT and the second RAT share the RF resources.

21. The apparatus of claim 20, further comprising means for receiving an indication that the RF resources to perform measurement on the one or more channel frequencies are not granted.

22. The apparatus of claim 19, further comprising:
means for maintaining a list of the one or more channel frequencies that are incompatible with the DR mode; and
means for excluding channel frequencies on the list when performing the channel measurement procedure with the second SIM.

23. The apparatus of claim 22, further comprising:
means for receiving signaling indicating a carrier reconfiguration for the first RAT; and
means for clearing the list in response to receiving the signaling.

24. The apparatus of claim 19, wherein the first RAT and the second RAT comprise different RAT types.

\* \* \* \* \*